(12) United States Patent
Wadell

(10) Patent No.: US 10,414,359 B2
(45) Date of Patent: Sep. 17, 2019

(54) SYSTEM FOR PROVIDING WIRELESS OPERATION OF POWERED DEVICE(S) ON A VEHICLE

(71) Applicant: Tyri International, Inc., Stevens Point, WI (US)

(72) Inventor: Christian Wadell, Hisings Backa (SE)

(73) Assignee: Tyri International, Inc., Stevens Point, WI (US)

( * ) Notice: Subject to any disclaimer, the term of this patent is extended or adjusted under 35 U.S.C. 154(b) by 692 days.

(21) Appl. No.: 15/042,321

(22) Filed: Feb. 12, 2016

(65) Prior Publication Data

US 2016/0236635 A1    Aug. 18, 2016

Related U.S. Application Data

(60) Provisional application No. 62/116,732, filed on Feb. 16, 2015.

(51) Int. Cl.
*H02J 50/10* (2016.01)
*B60R 16/033* (2006.01)
(Continued)

(52) U.S. Cl.
CPC .............. *B60R 16/033* (2013.01); *B60L 1/00* (2013.01); *B60L 1/14* (2013.01); *H04B 5/0037* (2013.01);
(Continued)

(58) Field of Classification Search
CPC .......... B60L 1/00; B60L 1/14; B60L 2200/42; B60R 16/033; B66F 9/0755; H02J 5/005; H04B 5/0037; H04B 5/0093; Y02T 90/16
See application file for complete search history.

(56) References Cited

U.S. PATENT DOCUMENTS

| 4,142,129 A | 2/1979 | Engstrom |
| 6,027,225 A | 2/2000 | Martin et al. |

(Continued)

FOREIGN PATENT DOCUMENTS

| CA | 2741239 | 11/2012 |
| EP | 1165361 | 10/2004 |

(Continued)

OTHER PUBLICATIONS

EP 16155983.6-1807 Search Report dated Jul. 14, 2016, 7 pages.

*Primary Examiner* — Jared Fureman
*Assistant Examiner* — Emmanuel Dominique
(74) *Attorney, Agent, or Firm* — Boyle Fredrickson, S.C.

(57) ABSTRACT

Charging for one or more powered devices on a vehicle may be implemented on support components of a vehicle which may be movable with respect to one another to accomplish a function. When the support components are in a first position, a power unit in communication with a power source of the vehicle may be used to charge a rechargeable power storage unit proximal to the power unit. The power storage unit, in turn, may provide power to one or more powered devices which may be separately housed. When the support components are in a second position, such as to accomplish a work function, the charged power storage unit may continue to provide power to the powered device(s) despite the power storage unit and the powered device(s) being distal to the power unit and the power source. In addition, or in the alternative, contact based charging may be implemented to charge the rechargeable power storage unit in the first position.

25 Claims, 5 Drawing Sheets

(51) Int. Cl.
*B60L 1/00* (2006.01)
*B60L 1/14* (2006.01)
*H04B 5/00* (2006.01)

(52) U.S. Cl.
CPC ........ *H04B 5/0093* (2013.01); *B60L 2200/42* (2013.01); *Y02T 90/16* (2013.01)

(56) References Cited

U.S. PATENT DOCUMENTS

| | | |
|---|---|---|
| 8,441,154 B2 | 5/2013 | Karalis et al. |
| 8,454,190 B2 | 6/2013 | Hau et al. |
| 8,629,652 B2 | 1/2014 | Partovi et al. |
| 8,813,985 B2 | 9/2014 | Robertson et al. |
| 8,841,891 B2 | 9/2014 | Failing |
| 2006/0255943 A1* | 11/2006 | Hougen ............. G06K 7/10346 340/572.1 |
| 2012/0145485 A1* | 6/2012 | McCabe ................. H02J 7/025 187/226 |
| 2012/0176005 A1 | 7/2012 | Pedersen |
| 2013/0154552 A1 | 6/2013 | Siessegger |
| 2013/0271069 A1 | 10/2013 | Partovi |
| 2013/0300204 A1 | 11/2013 | Partovi |
| 2014/0240968 A1 | 8/2014 | Brown |
| 2016/0233687 A1* | 8/2016 | McKernan ............. H02J 5/005 |

FOREIGN PATENT DOCUMENTS

| | | | |
|---|---|---|---|
| EP | 2178738 | 4/2011 | |
| EP | 2420408 | 5/2013 | |
| JP | 07285612 A * | 10/1995 | ............ B66F 9/0755 |
| JP | 2001 061239 | 3/2001 | |
| JP | 2011 217742 | 11/2011 | |
| WO | 2014027246 | 2/2014 | |

\* cited by examiner

SYSTEM FOR PROVIDING WIRELESS OPERATION OF POWERED DEVICE(S) ON A VEHICLE

CROSS-REFERENCE TO RELATED APPLICATION(S)

This application claims priority to U.S. Provisional Patent Application No. 62/116,732, entitled "System for Providing Wireless Operation of Electronic Device(s) on a Vehicle," filed on Feb. 16, 2015, which is herein incorporated by reference.

FIELD OF THE INVENTION

This invention relates to a system for providing charging on a vehicle, and more particularly, to a system for providing charging from a charging source to one or more electronic devices, such as a light-emitting diode (LED), the charging source and the electronic device(s) on support mechanisms being movable with respect to one another.

BACKGROUND OF THE INVENTION

Working vehicles, such as trucks, forklifts, cranes, backhoes, excavators, bulldozers, loaders and the like, oftentimes include mechanisms which may be movable with respect to one another to accomplish a function. For example, tow trucks may be fitted with beds which may be hydraulically inclined and moved to ground level to allow disabled vehicles to be loaded. As another example, forklifts will typically include forks which may be raised along masts or uprights for lifting and moving heavy objects on pallets. Integral in these vehicles is the ability to provide a mechanical movement to accomplish a function, such as lifting, digging, swinging, rotating, holding, and the like.

It is known to include lighting systems in such working vehicles. Lighting systems may include one or more of incandescent lights, fluorescent lights, light-emitting diodes (LED's) and the like. Such lighting systems are typically used to illuminate darkened work areas to improve working ability and safety conditions.

However, with vehicles providing mechanical movements to accomplish a function, it can be difficult to continuously and effectively illuminate areas in which the movable mechanisms may be directed. Although an increased number of lights and/or amount of lighting may be applied, such increases typically increase material costs, power requirements and maintenance time. As a result, overall system costs increase. It is therefore desirable to provide a system by which lighting may be improved for vehicles without one or more of the aforementioned drawbacks.

SUMMARY OF THE INVENTION

The present inventor has recognized that charging for one or more electronic devices on a vehicle may be implemented on support components or mechanisms of a vehicle which may be movable with respect to one another to accomplish a function. When the support mechanisms are in a first position, a power unit in communication with a power source of the vehicle may be used to wirelessly charge a rechargeable power storage unit, such as a battery, proximal to the power unit. The power storage unit, in turn, may provide power to one or more electronic devices which may be separately housed. When the support mechanisms are in a second position, such as to accomplish a work function, the charged power storage unit may continue to provide power to the electronic device(s) despite the power storage unit and the electronic device(s) being spaced apart from or distal to the power unit and the power source. In addition, or in the alternative, contact based charging may be implemented to charge the rechargeable power storage unit when the support mechanisms in the first position.

Accordingly, a power unit may be used to provide "inductive charging" (also known as "wireless charging") to a power storage unit. Inductive charging uses an electromagnetic field to transfer energy between two objects. A first object, such as the power induction unit, may generate an electrical current through a primary coil to produce an electromagnetic field. A second object, such as the power storage unit, may receive an induced current via a secondary coil when placed in the presence of the electromagnetic field. The induced current may be used to charge and recharge the power storage unit, which, in turn, may be used to power the electronic device(s).

It is also contemplated to include a lock by which the power unit and the power storage unit may be fixed together. As a result of the lock, the power unit and the power storage unit may move together through a limited range to maximize charging while in the first position. The lock could be magnetically and/or mechanically operated. Contact based charging may be provided in addition to or alternative to induction based charging.

In addition, the lock could be disabled by a spring attached to either of the power unit or the power storage unit. For example, when a power storage unit is locked to a power unit and the power storage unit is moved beyond a threshold amount of movement, a spring attached to the power unit may cause a tension sufficient enough to overcome the lock and thereby pull the power unit away from the power storage unit and into the second position.

The electronic device(s) may, for example, include one or more of an LED, a camera and/or a wireless communication interface. The electronic device(s) may also include a controller configured to operate various components of the electronic device(s). The controller may cause, for example, one or more LED's to produce various lighting effects, such as to brighten a work area, dim, flash, strobe, pattern or the like The LED's may be of various colors and arrangements as known in the art.

One application may include wireless lighting on a forklift. When forks are lowered, a lighting system including a power storage unit and light source may be placed near a charging source. When the forks are raised, the lighting system may be moved away from the charging source (with charging stopped) along with the forks and the lighting system may activate to illuminate a work area around or in the vicinity of the forks.

Specifically, one aspect of the present invention includes a system for providing charging on a vehicle. The system includes first and second support components or mechanisms movable with respect to one another; a power storage unit attached to the first support mechanism; a power unit attached to the second support mechanism for inductively charging the power storage unit when the power unit is proximal to the power storage unit in a first position; and an electronic device configured to receive power from the power storage unit. The electronic device is operable when the power storage unit is spaced apart from or distal to the power unit in a second position.

These and other aspects and objects of the present invention will be better appreciated and understood when considered in conjunction with the following description and the accompanying drawings. It should be understood, however, that the following description, while indicating a representative embodiment of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiment illustrated in the drawings accompanying and forming a part of this specification, wherein like reference numerals designate the same elements in the several views, and in which.

Figure 1:
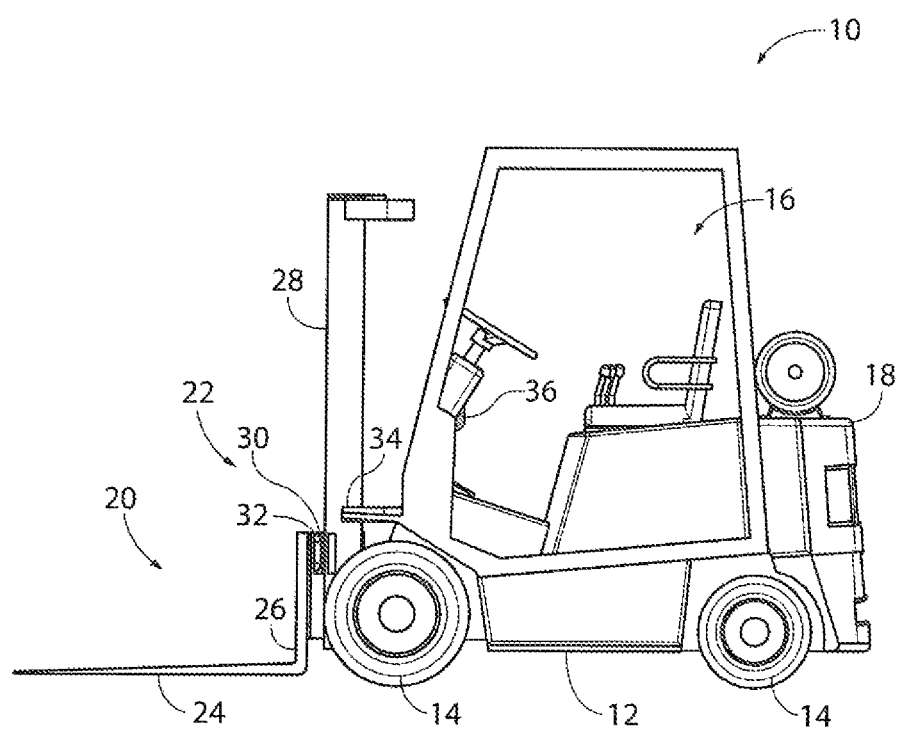
FIG. 1 is a side elevation view of a vehicle incorporating a charging system in accordance with the present invention, in which a power unit and a power storage unit of the charging system are in a first position and proximal to each other.

In describing the embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION

The present invention and the various features and advantageous details thereof are explained more fully with reference to the non-limiting embodiments described in detail in the following description.

Referring now to FIG. 1, a side view of an exemplary vehicle 10, such as a forklift, incorporating a charging system is provided in accordance with the present invention. The vehicle 10 could be any type of vehicle, and representatively may be a working vehicle for accomplishing a function, such as a truck, a forklift, a crane, a backhoe, an excavator, a bulldozer, a loader, a tow truck or the like. The vehicle 10 may include a frame 12, wheels 14, an operator cab 16, and an electric power source 18, along with a conventional engine, and first and second support components or mechanisms 20 and 22, respectively. The operator cab 12 may include a seat for an operator along with instrumentation and controls for monitoring and controlling the vehicle 10. From the operator cab 12, an operator may control, for example, movement of the first support mechanism 20 with respect to the second support mechanism 22. For example, for a forklift, an operator in the operator cab 12 may control the first support mechanism 20, which may include forks 24 and/or a load apron 26, to move upward or downward with respect to the second support mechanism 22, which may include uprights or masts 28, to move a pallet.

A power storage unit 30 with a power contact receiver and/or an induction receiver may be attached to the first support mechanism 20. The power storage unit 30 may include one or more batteries, capacitors and/or other electronic or chemical elements for storing electrical power as known in the art. The power storage unit 30 may be a wirelessly rechargeable power storage unit via the induction receiver, and/or may be rechargeable by direct power contact, and can provide power to one or more device(s) 32, which representatively may be one or more electronic device (s). The electronic device(s) 32 may be physically integrated with the power storage unit 30 as illustrated, or may be separately housed.

A power unit 34 may be attached to the second support mechanism 22 (which, in turn, may be anchored to the vehicle 10), and the power unit 34 may move a distance inside a housing or receiver associated with the second support mechanism 22. The power unit 34 may receive power from the power source 18, such as the electrical system of the vehicle 10, to produce an electromagnetic field. As a result of the electromagnetic field, the power unit 34 may inductively charge the power storage unit 30 when the power unit 34 is proximal to the power storage unit 30 in a "first position," which may be a lowered position. For example, as shown in FIG. 1, the first and second support mechanisms 20 and 22, respectively, may be positioned such that the power unit 34 is proximal to the power storage unit 30 for inductively charging the power storage unit 30 in the first position. In addition, or alternatively, the power unit 34 may provide direct contact charging to the power storage unit 30 in the first position.

The vehicle 10 may also include a wireless communication device 36. The wireless communication device 36 may be operable to communicate with the one or more of the electronic device(s) 32. The wireless communication device 36 may also be integrated with instrumentation and controls in the operator cab 12, thereby permitting an operator control over the electronic device(s) 32.

Figure 2:
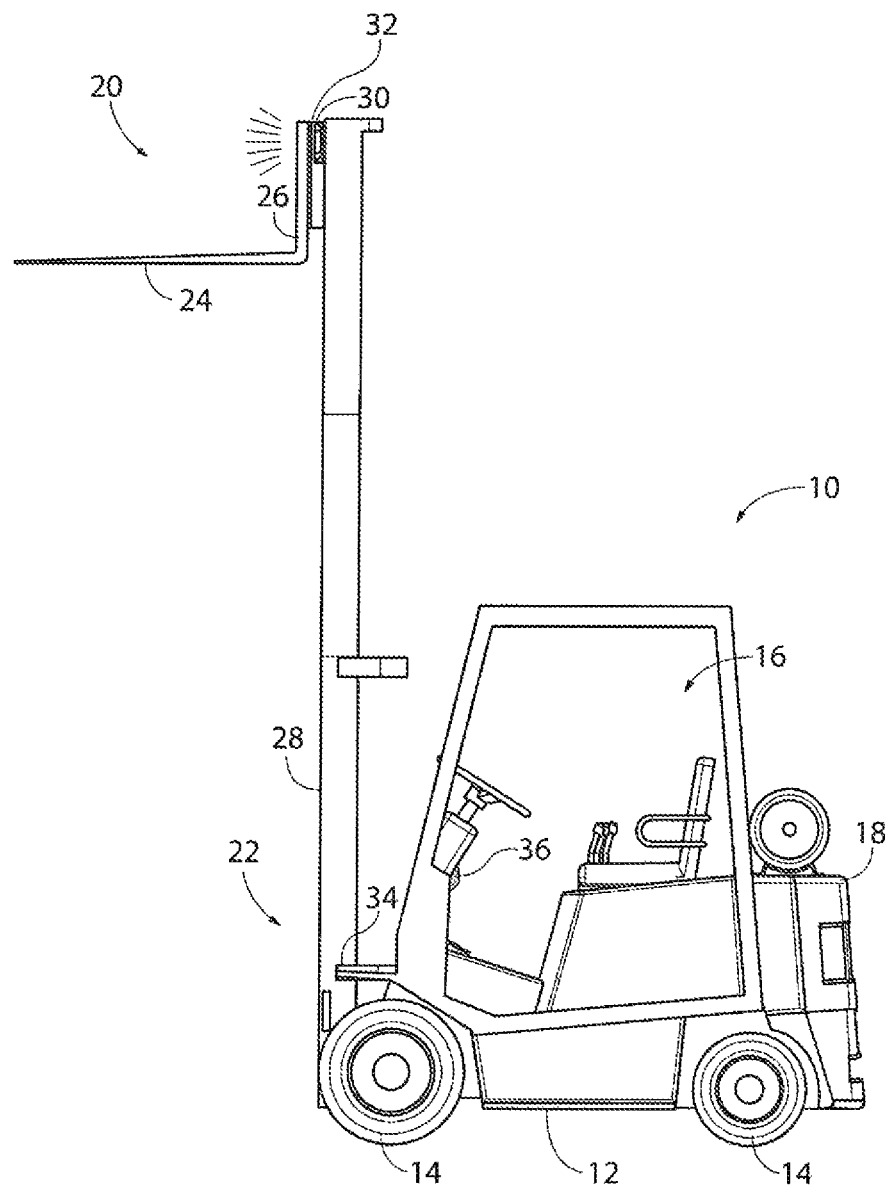
FIG. 2 is a side elevation view of the vehicle of FIG. 1, in which the power unit and the power storage unit of the charging system are spaced apart from or distal to one another and therefore no longer charging, and showing operation of an electronic device, such as a lighting arrangement, to illuminate a work area of the vehicle.

Referring now to FIG. 2, in a "second position" of the vehicle 10, which may be a working position such as a raised position, the power unit 34 and the power storage unit 30 are spaced apart from or distal to one another. As a result, the power unit 34 no longer charges the power storage unit 30. However, the electronic device(s) 32 is still operable, despite the power unit 34 being spaced from or distal to the power storage unit 30, due to charge in the power storage unit 30 that is operable to provide power to the electronic device(s) 32. For example, as shown in FIG. 2, the first and second support mechanisms 20 and 22, respectively, may be positioned such that the power unit 34 is spaced from or distal to the power storage unit 30, thereby disrupting inductive and/or contact charging of the power storage unit 30, in the second position.

Representatively, by way of example, the power unit 34 and the power storage unit 30 may be configured such that when the first support mechanism 20 is less than about 20% of its travel distance from the second support mechanism 22, the power unit 34 and the power storage unit 30 may be proximal to one another for charging in the first position. Conversely, when the first support mechanism 20 is greater than about 20% of its travel distance from the second support mechanism 22, the power unit 34 and the power storage unit 30 may be sufficiently spaced from or distal to one another to disrupt charging in the second position.

Figure 3:
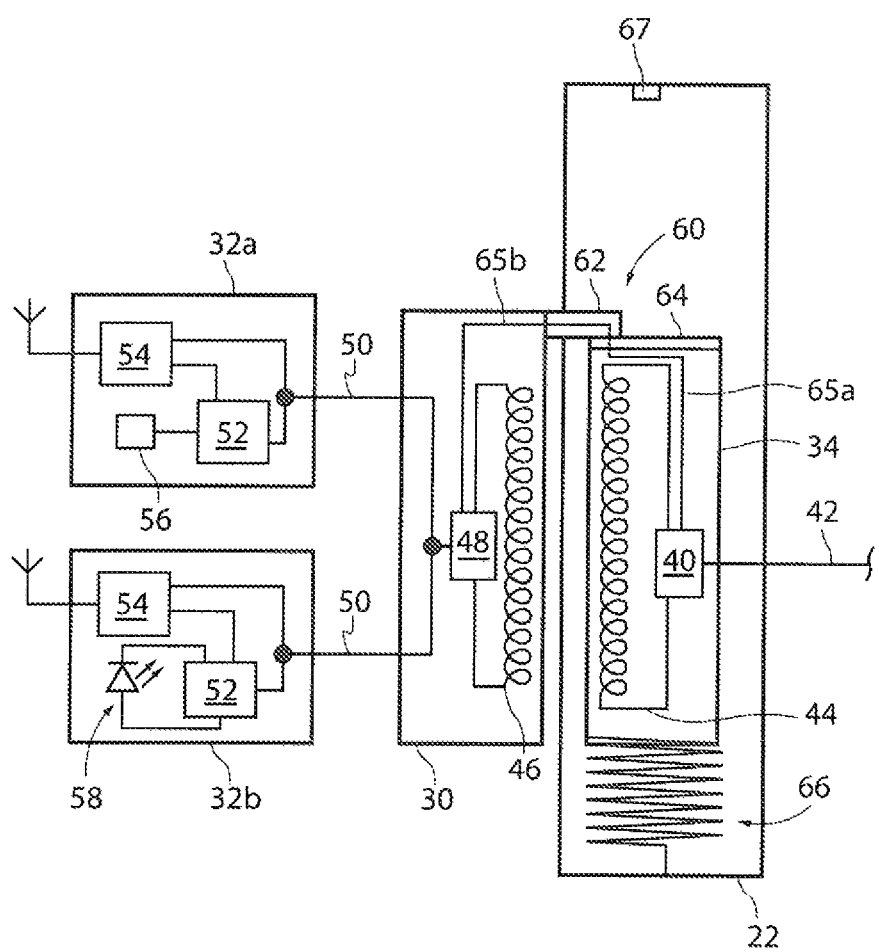
FIG. 3 is a schematic view of the charging system of FIG. 1, in which the power unit is proximal to the power storage unit for charging the power storage unit in a first position.

Referring now to FIG. 3, a schematic view of the charging system of FIG. 1 is provided. In the first position, the power unit 34 is proximal the power storage unit 30 to inductively and/or contact charge the power storage unit 30. The power unit 34 may include power unit circuitry 40 configured to receive power from the power source 18, of the vehicle 10, via a power signal 42. For inductive charging, the power unit circuitry 40 may, in turn, generate an electrical current in a primary coil 44 in order to produce an electromagnetic field and transmit power.

The electromagnetic field, in turn, induces an electrical current in a secondary coil 46 of the power storage unit 30. The distance between the power unit 34 and the power storage unit 30 in the presence of the electromagnetic field may be small, such as approximately 10 mm, which may also help to prevent dirt buildup. Power storage unit circuitry 48 of the power storage unit 30, in turn, receives the induced electrical current from the secondary coil 46 and operates to charge local power storage unit cells in power storage unit 30 accordingly. The power storage unit circuitry 48 then provides power to the electronic device(s) 32, such as an electronic device 32a, which may be a camera, and an electronic device 32b, which may be a light source, via a power storage unit power signal 50.

The electronic device(s) 32 may each include a controller 52 operable to execute a program stored in a computer memory or other non-transitory medium. The electronic device(s) 32 may also each include includes a wireless communication interface 54 in communication with the controller 52. The wireless communication interface 54 may allow communication with the wireless communication device 36 of the vehicle 10. As a result, an operator may monitor and control the electronic device(s) 32, such as to brighten a work area, dim, flash, strobe or pattern LED's, stream camera images and the like.

In addition, the electronic device 32a, which may be a camera, may include controllable camera circuitry 56, such as an image sensor. Alternatively, the electronic device 32b, which may be a light source, may include one or more controllable LED's 58. Various functionalities of the electronic device(s) 32 may be separated and/or combined among one or more other electronic device(s) 32 and/or the power storage unit 30 within the scope of the invention.

The power unit 34 and/or the power storage unit 30 may be in fixed positions, or may be configured to move a relatively small distance, with respect to their supporting mechanisms. If either is configured to move, a lock 60 may also be provided between the power storage unit 30 and the power unit 34. The lock 60 may cause the power storage unit 30 and the power unit 34 to be movable together over a limited range in the first position when the lock is enabled. For example, as the first support mechanism 20 moves the power storage unit 30 in a direction, the power storage unit 30 may lock to the power unit 34 to correspondingly move the power unit 34 a small distance in the same direction, despite the second support mechanism 22 remaining stationary.

The lock 60 may be magnetically and/or mechanically operated. The lock 60 may include a first portion 62 connected to the power storage unit 30 and a second portion 64 connected to the power unit 34. The first and second portions 62 and 64, respectively, could be opposite poles of a magnet, for example. Such a magnet could be a permanent magnet, such as one made from an alloy of neodymium, or could be an electromagnetically produced magnetism, or otherwise. Alternatively, the first and second portions 62 and 64, respectively, may be opposite portions of a mechanical lock, such as a hook and loop, a detent and pin, or otherwise. The lock 60 may cause the power storage unit 30 and the power unit 34 to be movable together, such as over a limited range of about ±100 mm, in order to maximize charging while in the first position.

The lock 60 may also provide a directly contacting electrical power connection between the power unit 34 and the power storage unit 30. When the first portion 62 is in contact with the second portion 64 (in the first position), the power unit 34 may charge the power storage unit 30 accordingly. For example, the power unit 34 may charge the power storage unit 30 inductively and/or by full contact, such as by conducting an electrical current via a first contact power signal 65a from the power unit circuitry 40 connecting to a second contact power signal 65b to the power storage unit circuitry 48 via the first and second portions 62 and 64. Such contact based charging may be in addition to, or alternative to, induction based power transfer via the primary coil 44 and the secondary coil 46.

Figure 4:
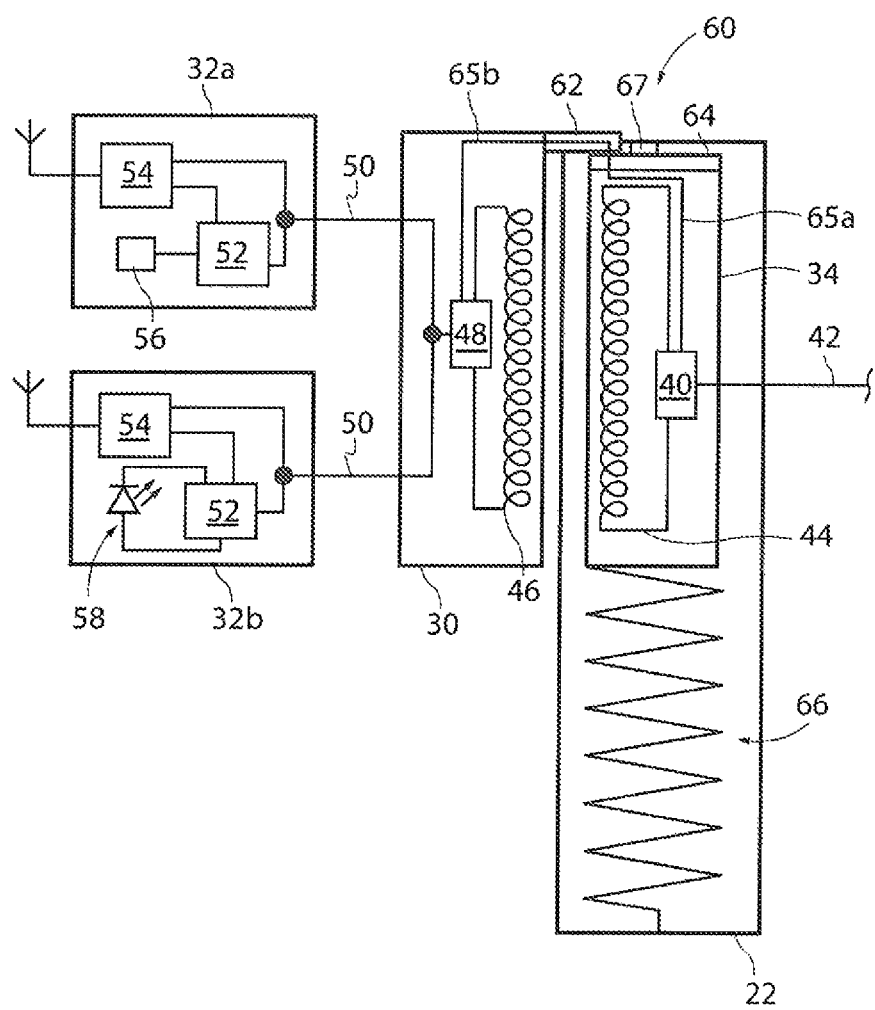
FIG. 4 is a schematic view of the charging system of FIGS. 1-3, in which the power unit remains proximal to the power storage unit for charging the power storage unit while the power unit and the power storage unit move together in the first position.

Either the power storage unit 30 or the power unit 34 may be attached to the first and second support mechanisms 20 and 22, respectively, via one or more springs. Such a spring may be operable to maintain positioning of the power storage unit 30 and/or the power unit 34 through a limited range with respect to the first and second support mechanisms 20 and 22, respectively, in the first position. For example, a spring 66 may be connected to the power unit 34 to maintain the power unit 34 in the first position (with the power storage unit 30) through a limited range with respect to the second support mechanism 22. Accordingly, the first position may be maintained until overcoming a tension of the spring 66 and/or reaching a stop 67 in the second support mechanism 22. As such, the spring 66 may operate from a compressed condition, as illustrated in FIG. 3, to an extended condition, as illustrated in FIG. 4. For example, when lifting the forks 24 of the vehicle 10, the lock 60 will lift the power unit 34, extending the spring 66, until a tension of the spring 66 is overcome and/or the power unit 34 reaches the stop 67. Then, the lock 66 will disable, and the power storage unit 30 will continue to travel upwards with the forks 24, away from the power unit 34. In a subsequent lock operation, such as when the forks 24 are lowered and the power storage unit 30 is again in proximity to the power unit 34, the lock 60 will enable again and overcome the force of the spring 66 to drag the power unit 34 along with the power storage unit 30 while charging.

Figure 5:
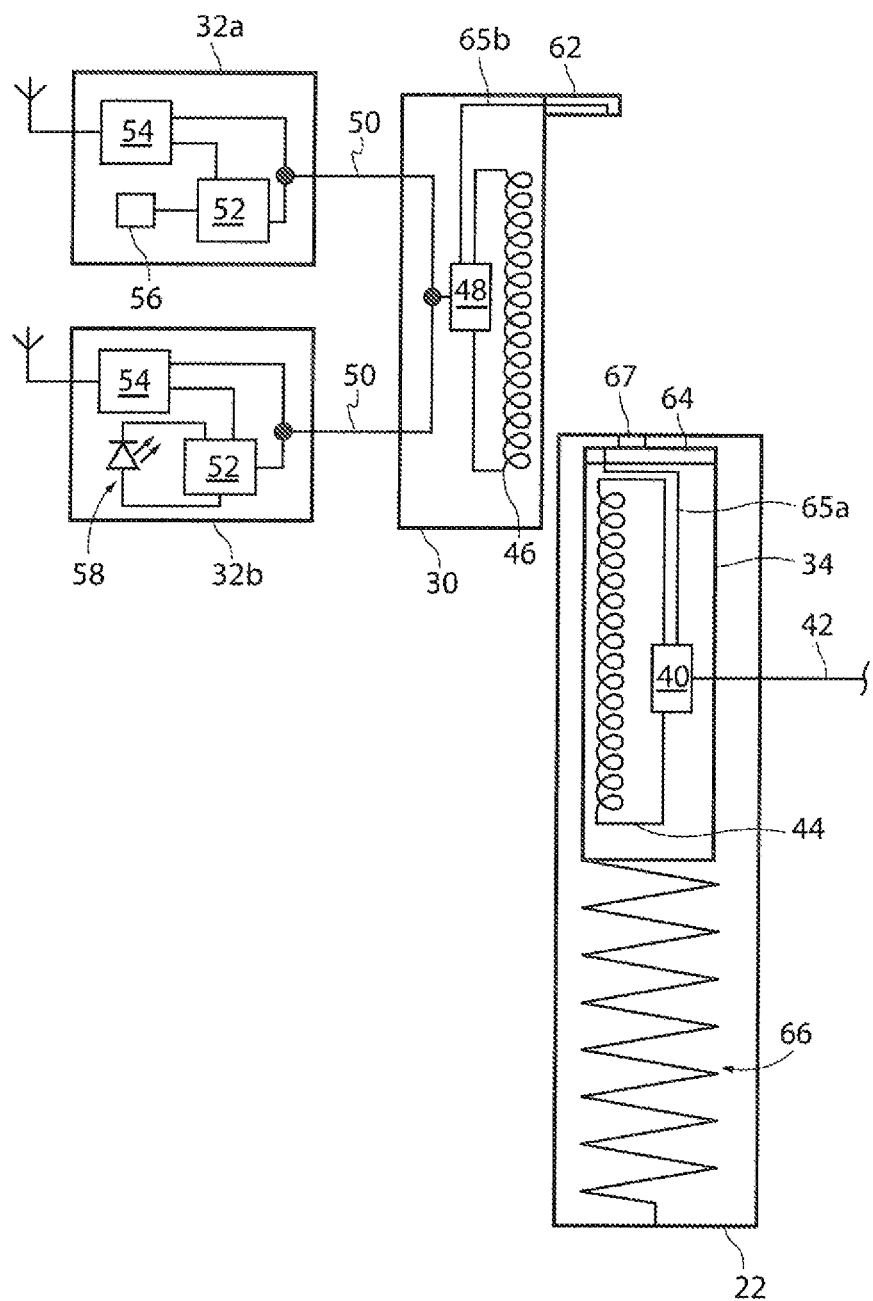
FIG. 5 is a schematic view of the charging system of FIGS. 1-4, in which the power unit is spaced apart from or distal to the power storage unit and no longer charging the power storage unit in a second position.

Accordingly, in one aspect, upon reaching the extended condition, the spring 66 may cause a tension sufficient enough to overcome the lock 60. As a result, the spring 66 may cause the power unit 34 to pull away from the power storage unit 30 (disabling the lock 60) and into the second position, as illustrated in FIG. 5. Upon disabling of the lock 60, in the second position, the power unit 34 may become distal to the power storage unit 30, thereby disrupting charging of the power storage unit 30. In addition, the spring 66 may cause the power unit 34 to return to an equilibrium position for a subsequent lock operation between the power unit 34 and the power storage unit 30 when the first and second support mechanisms, 20 and 22, respectively, move again into proximity. Also, in another aspect, the stop 67 may prevent the power unit 34 from further travel, thereby overcoming the lock 60 and causing the power unit 34 to return to the equilibrium position via the spring 66 for a subsequent lock operation.

The present invention has been shown with the spring 66 connected to the power unit 34. It should be appreciated, however, that a spring may in addition, or alternatively, be connected to the power storage unit 30. Accordingly, other alternative configurations may be employed as desired without departing from the scope of the invention as set forth above. In addition, while the present invention has been shown and described with respect to the power storage unit 30 being employed to power an electronic device remotely from the power unit 34, it is understood that the present invention contemplates providing power to any type of powered component or device carried by or secured to a movable component of a vehicle and is not limited to electronic devices.

Various additions, modifications and rearrangements are contemplated as being within the scope of the following claims, which particularly point out and distinctly claim the subject matter regarded as the invention, and it is intended that the following claims cover all such additions, modifications and rearrangements.

I claim:

1. A system for providing operation of a powered device on a vehicle, comprising:
    first and second support components of the vehicle that are movable with respect to one another;
    a power storage unit attached to the first support component;
    a power unit attached to the second support component, the power unit being operable to charge the power storage unit when the power unit is proximal to the power storage unit in a first position;
    a powered device configured to receive power from the power storage unit, wherein, the powered device is configured to operate when the power unit is spaced apart from the power storage unit in a second position; and
    a lock between the power storage unit and the power unit, wherein the lock is configured to be selectively enabled and disabled, and wherein the power storage unit and the power unit are each movable together in the first position when the lock is enabled.

2. The system of claim 1, further comprising a spring, wherein at least one of the power storage unit and the power unit is attached to the respective support component via the spring.

3. The system of claim 2, wherein the lock is magnetically operated.

4. The system of claim 3, wherein the lock is disabled by a tension of the spring.

5. The system of claim 1, wherein the powered device includes a light emitting diode (LED), a camera and/or a wireless communication interface.

6. The system of claim 1, wherein the power unit is operable to charge the power storage unit in the first position by wireless induction.

7. The system of claim 1, wherein the first support component includes forks of a forklift.

8. The system of claim 1, wherein the powered device is physically integrated with the power storage unit.

9. The system of claim 1, wherein the power unit is operable to charge the power storage unit in the first position by inductive charging and direct contact charging.

10. A method for operating a powered device on a vehicle, comprising:
    attaching a power storage unit to a first support component;
    attaching a power unit to a second support component;
    charging the power storage unit when the power storage unit is proximal to the power unit in a first position;
    moving the first and second support components with respect to one another so that the power storage unit is spaced apart from the power unit in a second position;
    operating a powered device receiving power from the power storage unit while the powered device and the power storage unit are spaced apart from the power unit in the second position; and
    locking the first support component to the second support component and moving each of the power storage unit with the power unit together when in the first position.

11. The method of claim 10, further comprising attaching at least one of the power storage unit and the power unit to the respective support component via a spring.

12. The method of claim 11, further comprising magnetically operating the lock.

13. The method of claim 12, further comprising disabling the lock upon reaching a tension of the spring.

14. A system for providing operation of a powered device on a forklift, comprising:
    a first support component including forks;
    a second support component including a mast in communication with the forks, wherein the first and second support components are movable with respect to one another;
    a power storage unit attached to the first support component;
    a power unit attached to the second support component, the power unit being operable to charge the power storage unit when the power unit is proximal to the power storage unit in a first position;
    a powered device attached to the first support component, the powered device including a light emitting diode (LED), the powered device being configured to receive power from the power storage unit, wherein the powered device is configured to operate when the power storage unit is spaced apart from the power unit in a second position; and
    a lock between the power storage unit and the power unit, wherein the lock is configured to be selectively enabled and displayed, and wherein the power storage unit and the power unit are each movable together in the first position when the lock is enabled.

15. The system of claim 14, further comprising a spring, wherein at least one of the power storage unit and the power unit is attached to the respective support component via the spring.

16. The system of claim 15, wherein the lock is magnetically operated.

17. The system of claim 15, wherein the lock is disabled by a tension of the spring.

18. A system for providing operation of a powered device on a vehicle comprising:
    first and second support components of the vehicle that are movable with respect to one another;

a power storage unit attached to the first support component;

a power unit attached to the second support component, the power unit being operable to charge the power storage unit when the power unit is proximal to the power storage unit in a first position;

a powered device configured to receive power from the power storage unit, wherein the powered device is configured to operate when the power unit is spaced apart from the power storage unit in a second position;

a lock between the power storage unit and the power unit, wherein the power storage unit and the power unit are movable together in the first position when the lock is enabled; and a spring, wherein at least one of the power storage unit and the power unit is attached to the respective support component via the spring.

19. The system of claim 18, wherein the lock is magnetically operated.

20. The system of claim 19, wherein the lock is disabled by a tension of the spring.

21. The system of claim 18, wherein the powered device includes a light emitting diode (LED), a camera and/or a wireless communication interface.

22. The system of claim 18, wherein the power unit is operable to charge the power storage unit in the first position by a direct power contact.

23. The system of claim 18, wherein the power unit is operable to charge the power storage unit in the first position by wireless induction.

24. The system of claim 18, wherein the first support component includes forks of a forklift.

25. The system of claim 18, wherein the powered device is physically integrated with the power storage unit.

* * * * *